(12) United States Patent
Alperovitch (10) Patent No.: US 12,441,484 B2
(45) Date of Patent: Oct. 14, 2025

(54) SYSTEM AND METHOD FOR REAL TIME COLLECTION OF FLIGHT DATA

(71) Applicant: Elta Systems Ltd., Ashdod (IL)

(72) Inventor: Hillel Alperovitch, Rishon Lezion (IL)

(73) Assignee: Elta Systems Ltd., Ashdod (IL)

( * ) Notice: Subject to any disclaimer, the term of this patent is extended or adjusted under 35 U.S.C. 154(b) by 212 days.

(21) Appl. No.: 18/266,875

(22) PCT Filed: Dec. 22, 2021

(86) PCT No.: PCT/IL2021/051522
§ 371 (c)(1),
(2) Date: Jun. 13, 2023

(87) PCT Pub. No.: WO2022/137237
PCT Pub. Date: Jun. 30, 2022

(65) Prior Publication Data
US 2024/0101270 A1    Mar. 28, 2024

(30) Foreign Application Priority Data

Dec. 27, 2020 (IL) .......................................... 279809

(51) Int. Cl.
*B64D 45/00* (2006.01)
*G07C 5/00* (2006.01)
(Continued)

(52) U.S. Cl.
CPC ............. *B64D 45/00* (2013.01); *G07C 5/008* (2013.01); *G07C 5/02* (2013.01); *H04L 67/12* (2013.01);
(Continued)

(58) Field of Classification Search
CPC ........................ B64D 45/00; B64D 2045/0065; G07C 5/008; G07C 5/02; G07C 5/0841;
(Continued)

(56) References Cited

U.S. PATENT DOCUMENTS 4,904,879 A    2/1990    Rudy et al.
6,009,356 A    12/1999   Monroe
(Continued)

FOREIGN PATENT DOCUMENTS

EP    0402427 A1    12/1990
EP    2995964 A1    3/2016
EP    3610585 A1    2/2020

*Primary Examiner* — Behrang Badii
(74) *Attorney, Agent, or Firm* — Ballard Spahr LLP (57) ABSTRACT

A wireless flight recordation system is disclosed for collecting black-box data of an aerial platform. The wireless flight recordation system includes one or more black-box data collectors for collecting black-box data that is recorded by one or more flight recorders of the aerial platform. The wireless flight recordation system also includes at least one data transmission interface connectable to the black-box data collectors for receiving the black-box data and establishing a wireless communication link with a wireless data communication network which is capable of providing data communication services to the aerial platform during flight. The data transmission interface transmits the black-box data or at least a parts thereof, via the wireless data communication network, to a receiver remote from the aerial platform. In some implementations the black-box data collectors are adapted to interface (e.g. sniff) one or more black-box cables, which provide data feed to the one or more flight recorders, to thereby indirectly receive the black-box data.

20 Claims, 5 Drawing Sheets

(51) Int. Cl.
  *G07C 5/02*    (2006.01)
  *H04L 67/12*   (2022.01)
  *H04W 76/10*   (2018.01)

(52) U.S. Cl.
  CPC ..... *H04W 76/10* (2018.02); *B64D 2045/0065* (2013.01)

(58) Field of Classification Search
  CPC ........ H04L 67/12; H04L 12/12; H04W 76/10; H04B 3/54
  See application file for complete search history.

(56) References Cited

U.S. PATENT DOCUMENTS

| | | | |
|---|---|---|---|
| 9,313,276 | B2 | 4/2016 | Pereira |
| 10,713,859 | B1* | 7/2020 | McZeal, Jr. ............. G01S 19/17 |
| 2003/0135311 | A1* | 7/2003 | Levine ............... H04B 7/18506 701/14 |
| 2003/0225492 | A1 | 12/2003 | Cope et al. |
| 2004/0027255 | A1 | 2/2004 | Greenbaum |
| 2011/0149849 | A1* | 6/2011 | Brownrig ........... H04B 7/18506 370/328 |
| 2013/0158751 | A1 | 6/2013 | Cornell et al. |
| 2013/0166135 | A1 | 6/2013 | Dunsdon |
| 2018/0044034 | A1 | 2/2018 | Newman et al. |
| 2018/0232970 | A1* | 8/2018 | Satyanarayana ....... B64D 45/00 |

\* cited by examiner

SYSTEM AND METHOD FOR REAL TIME COLLECTION OF FLIGHT DATA

TECHNOLOGICAL FIELD

The present invention is the field of flight recording systems, and more specifically relates to techniques for backup of flight recorders data.

BACKGROUND

Flight recorders are electronic recording devices placed in an aircraft for the purpose of facilitating an investigation of aviation accidents and other incidents which may occur during flight, takeoff or landing of the aircraft, to establish the factors which caused the incident. Flight recorders are also known as, and are referred to herein after as "black-boxes", although they are typically colored with bright colors such as orange in order to aid in their recovery after accidents.

A typical flight recorder system can be comprised of two independent flight reorders (black-boxes), FDR (Flight Data Recorder) and CVR (Cockpit Voice Recorder). The FDR receives and stores data from Flight Data Acquisition Units (FDAU), which is connected to a plurality of sensors located at different parts of the aircraft. The FDR records data such as acceleration, airspeed, altitude, flap settings, outside temperature, engine performance, actuator positions, and cabin temperature and pressure. The CVR is a flight recorder used to record the audio environment in the flight deck of an aircraft for the purpose of investigation of incidents (e.g. accidents). This is achieved by recording the signals of the microphones and earphones of the pilots' headsets and of microphones located in various locations inside the cockpit.

Black-boxes are generally required to be highly reliable systems to ensure, as much as possible, the recording of data during various incidents and the ability to preserve and recover the data afterwards. In order to aid the protection of flight recorders and to enable their recovery after an accident, the flight recorders are typically installed/disposed in the rear part of the airplane where they are more likely to survive a crash (since the rear part is supposed to be the last to crash). Accordingly, in typical installation, the flight recorders at the rear part of the aircraft are connected by relatively long cables to the cockpit or to various sensors from which data to be recorded thereby originates or is processed. The installation of the flight recorders and its cables is typically "supervised"/standardized to ensure reliable data recording and preservation of data integrity.

In order to enable recovery of the flight recorder/s after an aviation accident or a crash of the aircraft, and perform an investigation, flight recorders are engineered to be resilient enough to withstand extreme heat, jarring crashes and tons of pressure in order to survive almost any type of crash, fire, temperature, and underwater environment.

The exterior of the FDR and the CVR is coated with heat-resistant bright orange paint for high visibility in wreckage (in aircraft crash scenarios), and the units are usually mounted in the aircraft's tail section, where it is more likely to survive a severe crash. In addition to this, the FDR and the CVR are equipped with an underwater locator beacon that sends out an ultrasonic pulse that is readily detectable by sonar and acoustical locating equipment.

GENERAL DESCRIPTION

One drawback of the flight recorders (black-boxes) described above is that they are located on the aircraft itself, and therefore the flight recorders must be physically obtained and must also be in a good enough condition to enable extraction of the data recorded on them. Although the above indicated measures are typically taken to ensure integrity of the recorded data after accident and enable recovery of the flight recorder, in some aviation accident cases (plane crash scenarios), the black-boxes suffer from severe damage, disabling recovery of the recorded data. An investigation to determine the factors which caused the accident cannot be performed. In other extreme aviation accident cases, the aircraft cannot be located (e.g. due to crashing into the ocean) and consequently the flight recorders cannot be recovered. For example, one well-known example is the incident where Malaysia Airlines Flight 370 disappeared on 8 Mar. 2014, resulting in a search which lasted more than three years, covering about 20,000 square kilometers, but which failed to locate the aircraft. Consequently, the black-boxes could not be recovered, and the factors causing the incident could not be determined.

In view of the above, the inventors of the present invention realized that there is a need in the art for a technique to backup the flight recorders' data in real time at a location remote from the aerial platform. Indeed, in case such real-time backup is implemented, the above deficiencies of existing technologies would readily be solved, regardless of whether or not the flight recorders have been recovered after an aviation incident, most or all of the critical data pertaining to the time (seconds, minutes or hours) before the incident would already be stored at a remote location from the platform, such that it can be recovered. It should be noted that the terms real-time or real time backup, pertain to data backup that is continuously carried out during the flight substantially simultaneously with the recordation of the data by the flight recorders (here the term simultaneously designates practically the same time except maybe for small time delays associated with data processing, communication and storage).

The inventors of the present invention further realized that with the present advancements of communication technologies and networks, a real-time continuous remote backup of flight recorders data, is practical. Indeed communication technologies, such as 5G or star-link networks, may provide/facilitate real-time broad-band communication between the aerial platform and a data storage facility at which the flight recorders data can be stored/recorded, and which is remote from the aerial platform. As may be appreciated, the continuous communication between the aerial platform and the data storage facility may persist during the flight/movement of the aerial platform via communication gateways, which may be a geographically distributed network of ground stations and/or satellites.

Thus, the present invention provides a novel system and method for backup of flight-recorder's data outside and remotely from an aerial platform. Advantageously, the technique of the present invention facilitates real time backup of the flight-recorder's data during the flight for storage of the data at a location remote from the aerial platform.

More specifically, according to a broad aspect of the invention there is provided a wireless flight recordation system for real time collection and remote storage black-box data of an aerial platform, such as an aircraft. The system includes one or more black-box data collectors for collecting black-box data. The system also includes at least one data transmission interface connectable to the black-box data collectors for receiving the black-box data. The data transmission interface is configured and operable for establishing a wireless communication link with a wireless data communication network that is capable of providing data communication services to the aerial platform during flight/movement of the platform. The data transmission interface is configured and operable for transmitting the black-box data or at least parts/portions thereof, via the wireless data communication network, to a receiver remote from the aerial platform, by which the transmitted parts/portions of the black-box data can be stored.

It should be understood that the phrase black-box data is used herein to designate data suitable/desirable for recordation by one or more respective flight recorders of the aerial platform. The types of data which are typically considered for recordation by flight recorders are generally known to those versed in the art. To this end, typically in some embodiments of the present invention, the black-box data, which is collected by the one or more black-box data collectors, includes at least one of cockpit voice recording (CVR) data, and flight data recording (FDR). Accordingly, the one or more black-box data collectors may be configured and operable according to at least one of the following:

the one or more black-box data collectors are connectable directly or indirectly to at least one or more flight sensors of the aerial platform for retrieving data therefrom and are adapted to process said data to obtain at least a portion of said FDR data in real time; and/or the one or more black-box data collectors are connectable directly or indirectly to one or more cockpit sensors of the aerial platform for retrieving data therefrom, and are adapted to process said data to obtain at least a portion of said CVR data in real time.

As indicated above, it is desirable that the wireless flight recordation system of the present invention operates in real time for the collection and transmission of the black-box data, as soon as possible after such black-box data is sensed/measured by the sensors on the aerial platform. Accordingly, in some embodiments the one or more black-box data collectors are configured to operate in real time for carrying out at least one of the following in real time:

process the data retrieved directly or indirectly from the flight sensors of the aerial platform, to obtain, in real time, at least a portion of the FDR data, as soon as possible (e.g. in the order of several or tens of seconds, or even less) after said data is measured by the flight sensors; and/or process the data retrieved directly or indirectly from the cockpit sensors of the aerial platform, to obtain, in real time, at least a portion of the CVR data, as soon as possible (e.g. in the order of several or tens of seconds, or even less) after said data is measured by the cockpit sensors;

In turn, the data transmission interface is adapted to receive, in real time, one or both of the portions of the FDR and/or CVR data that are obtained in real time by the black-box data collectors, and pack and transmit one or both of the portions of the FDR and/or CVR data, so that it is received by the remote receiver, substantially in real time (e.g. in the order of several or tens of seconds, or even less after these portions of the FDR and/or CVR data are measured by the sensors of the aerial platform).

It should be noted that implementation of the above described wireless real-time flight recordation system with direct or indirect connection to the sensors is readily applicable for newly manufactured aerial-platforms/aircrafts, particularly when direct connection to the sensors of the aerial platform is implemented (i.e. here, the sensors of the aerial platform designate in general the flight sensors and/or cockpit sensors and the connection to the sensors may be implemented directly or via the sensor cables or via a data BUS of the aerial platform if such exists).

However, the inventors of the present invention also understood that implementation/installation of such systems in already existing aerial platforms, present additional problems. Indeed, installation of the wireless real-time flight recordation system of the invention with direct connection to the sensors, or even with indirect connection via the other aircraft hardware that is connected to the sensors, might be cumbersome and costly (since the sensors and other hardware are typically distributed at various locations of the aerial platform, and might also present security and regulation issues, since most or all of the sensors and hardware connected thereto are required for safe flight, and thus intervening with them or their connection might present risk and/or regulation issues).

The inventors of the present invention have realized that solutions for these problems can be found for aerial platforms that are already equipped with conventional flight recorder(s) on board the aerial platform.

For instance, according to an embodiment of the present invention, one possible solution to this problem would be to interface (e.g. by physical connection or by a wireless/sniffing interface) the black-box data collectors of the system, with the cables (hereinafter also black box cables) that provide data feed and possibly also power supply to the conventional (e.g. pre-existing) flight recorder(s) on board the aerial platform. As the cables of each black-box carries all the black-box data that needs to be recorded by the respective backbox, interfacing, or connecting, with said cables may present an indirect connection to the sensors by which all the required black-box data can be retrieved.

Such an interface or connection may be implemented utilizing a digital or analog signal splitter/duplicator (such as a network hub) that is capable of splitting/duplicating the signals communicated through a cable (hereinafter also black-box cables) that provide data feed to a flight recorder of the aerial platform to provide at least a part therefor to the black-box data collectors of the system.

Thus, according to some embodiments of the present invention, the wireless flight recordation system includes one or more signal splitters/duplicators (e.g. digital or analog hubs), that are adapted to implement the above indicated with one or more of the black-box cables of the aerial platform. Here the interface is implemented by physical connection of the signal splitter(s)/duplicator(s) with the cable(s). More specifically, each signal splitter/duplicator is connected to a black-box data collector of the system and is also connected to a black-box cable, which is connected to a flight recorder of the aerial platform. The signal splitter/duplicator is configured and operable for duplicating/splitting digital or analog signals, which provide said data feed to the flight recorder, such that a duplicate of signals that are communicated to the respective flight recorder, and another duplicate, which may be of only a part of these signals, is communicated to the black-box data collector of the system. Accordingly, in this embodiment, the signal splitter(s)/duplicator(s) of the system, facilitate indirect connection between the system and sensors of the aerial platform, via the cable(s) of the flight recorder(s) of the aerial platform.

Alternatively or additionally, in some embodiments of the present invention the black-box data collectors of the system are adapted to implement a contactless/wireless interface with the cables of the flight recorders of the aerial platform. The black-box data collectors include one or more black-box data sniffers adapted to implement such an interface with one or more black-box cables. For instance, each black-box data sniffer may be associated with a respective black-box cable of a flight recorder of the one or more flight recorders and is configured and adapted to sense signals, which are communicated through said cable to provide said data feed to the flight recorder, from outside the cable and without interfering with the cable or the signals communicated therethrough.

Thus, in some implementations, the present invention provides for collecting/sensing signals, which are provided/communicated to one or more black-boxes for storage of data therein, and for processing and sending a copy of at least a part of the data to be stored on the black-box, for backup storage at the remote location. Advantageously, the system of the present invention may be implemented as a non-contact and a non-disruptive interface with the black-box whose data is to be backed-up. In some implementations the system passively collects the black-box data without physical electrical contact between the system and the black-boxes or its cable(s) (the cables which carry data or power signals to the black-box(es), e.g. from a corresponding system(s) in the aircraft), and without affecting the signals through the cables (i.e. passively). For example, the signals (data or power) being communicated to the black-box may be collected/sensed by the system, by measuring electromagnetic fields of various frequency ranges in the vicinity of the cable(s). It should be noted that the term electromagnetic fields is used herein to designate the sensing of either electric fields or magnetic fields near one or more regions of the cable(s) or to designate the sensing of both electric and magnetic fields. The measuring of the electromagnetic fields can be carried out for example, by measuring/sensing the magnetic field in the vicinity of the cable(s) carrying the data/power signals to the black-box(es), or/and by measuring the electric field in the vicinity of said cable(s). Accordingly, the system may be installed to collect data of an existing black-box, without dismantling and/or reinstalling the black-box itself, or disconnecting or interfering with the cables communicating data to the black-box. The measured data/signals may then be filtered to reduce noise and/or clutter which may be significant in implementations in which the data/signals of the cables are sensed/measured externally from outside the cables. The present invention, as described below, provides various techniques for carrying out such filtration for obtaining data integrity. After the data is collected/measured, and possibly filtered (to reduced noise/clutter), the system operates for transmission of the data to a remote receiver disposed at a location of interest, for example a satellite (e.g. and therefrom to a ground station/gateway), or to a control tower or another aircraft. In some implementations the data transmission to the remote receiver is performed in real-time, preferably continuously, so that at any given moment most of the black-box data is backed up remotely. Accordingly, the data sent to the remote location can be, in turn, processed and analyzed in real-time at the remote location e.g. to provide alert or feedback to the pilot, or when necessary. The collected data can also be stored/backed-up to facilitate the investigation of aviation accidents/incidents in cases where the black-boxes are totally inoperable, making the data extraction from them practically impossible, or in cases where the black-box cannot be located/found. Further, this data can also facilitate in locating a crashed aircraft in difficult environments (e.g. when an aircraft has crashed into the ocean etc.).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
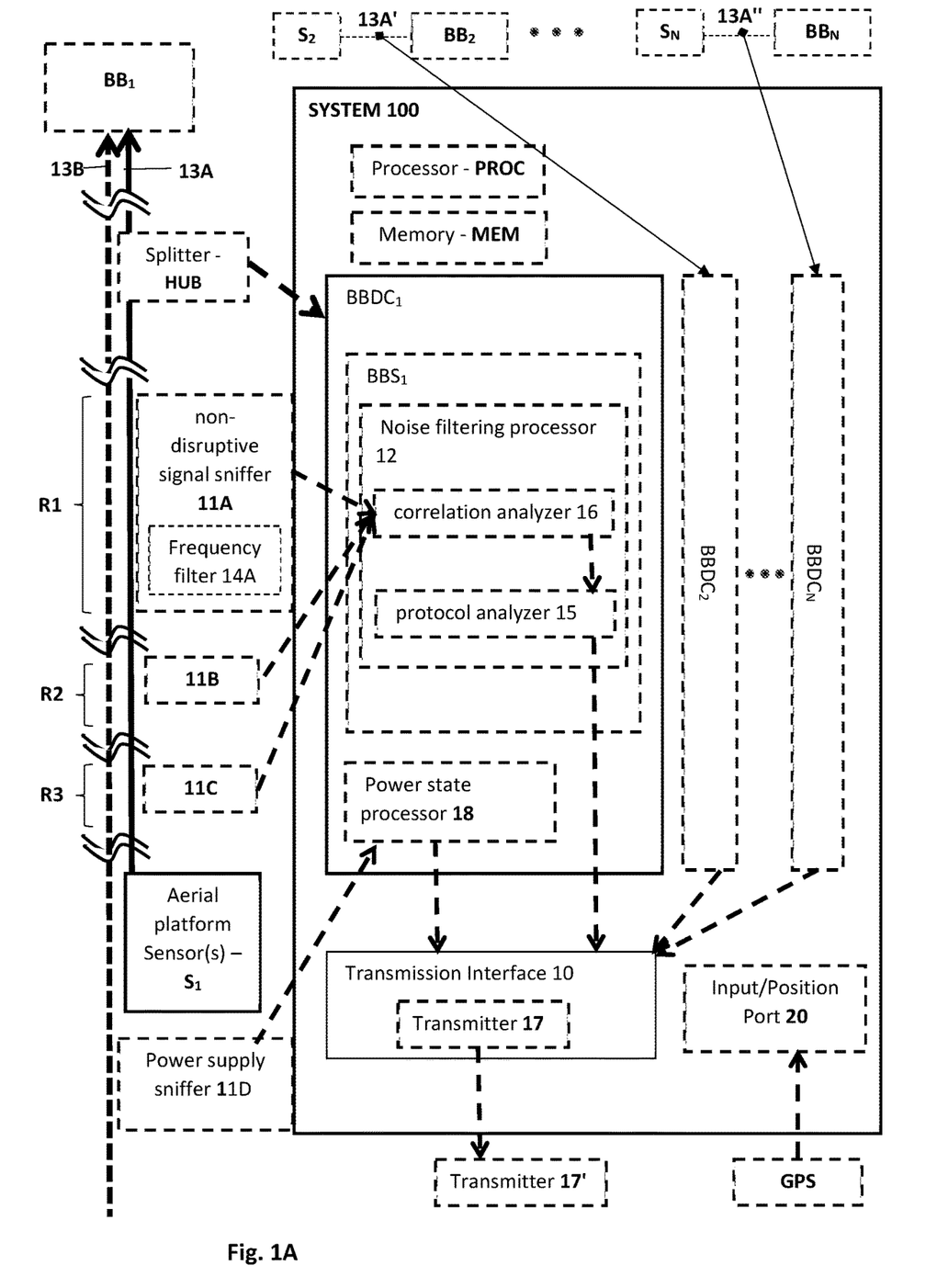
FIGS. 1A to 1C, are block diagrams, exemplifying the configuration and operation of the wireless flight recordation system 100 according to various embodiments of the present invention.
Figure 1B:
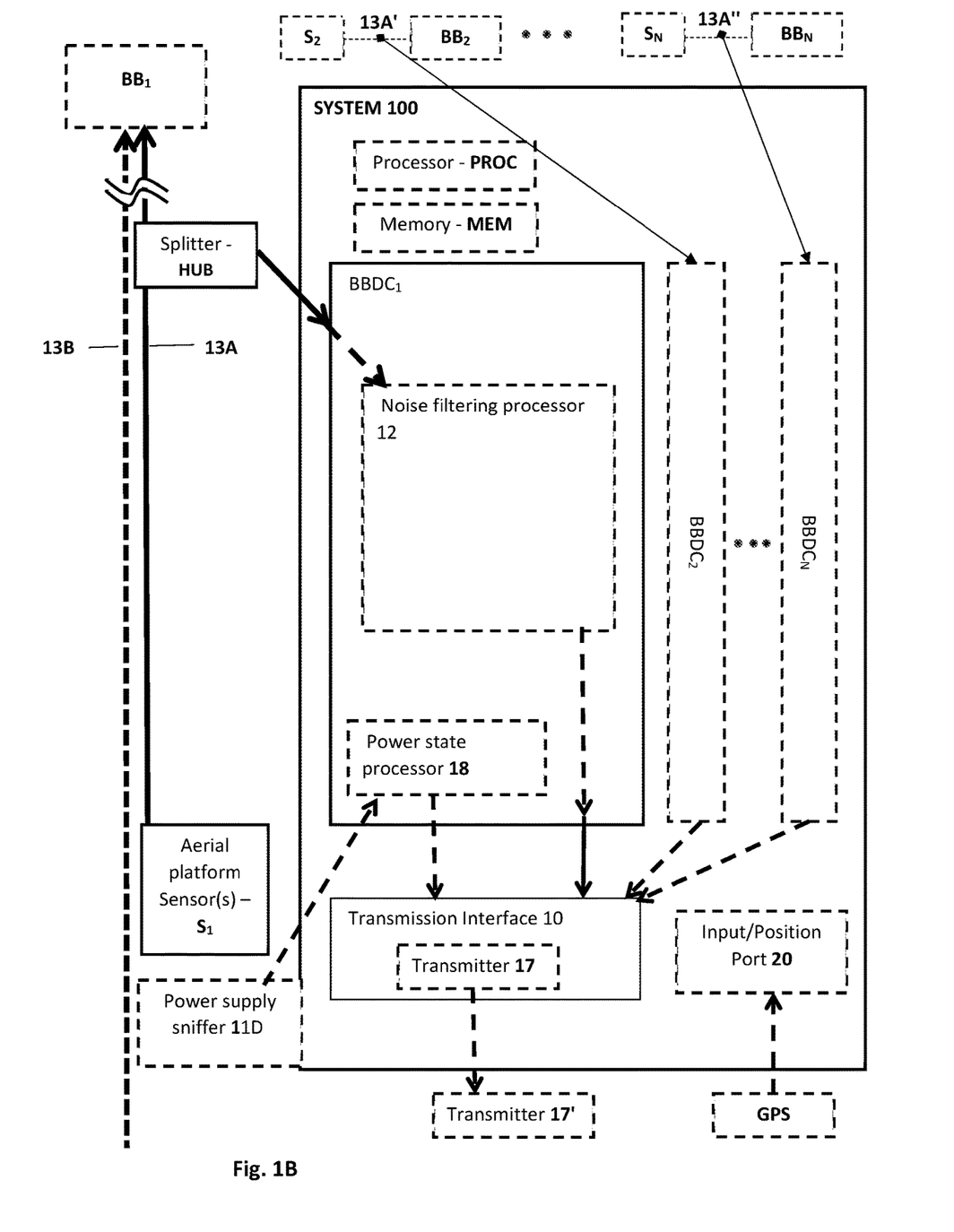
Figure 1C:
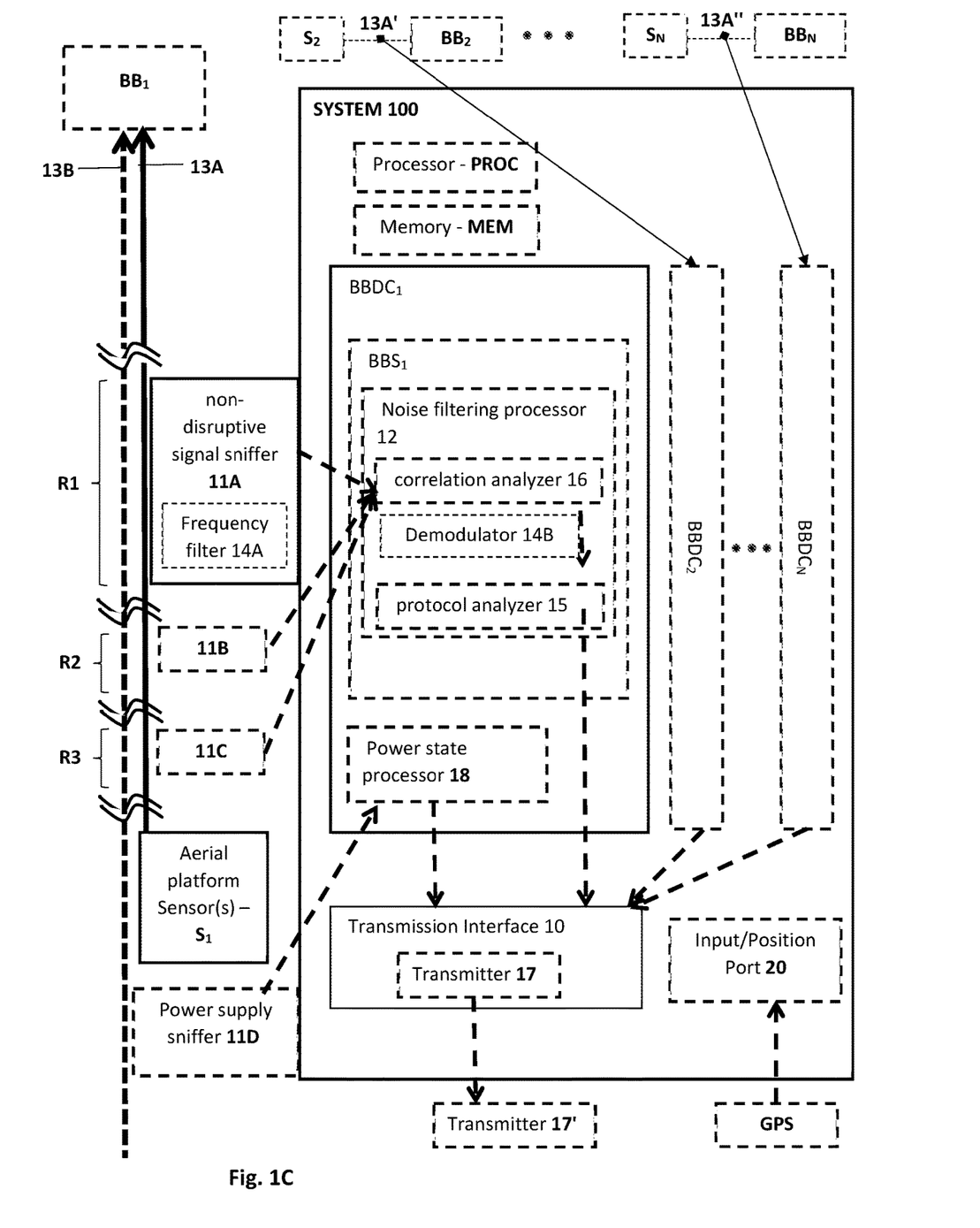

Reference is made to together to FIGS. 1A to 1C, which illustrate, by a way of block diagrams, a wireless flight recordation system 100 according to embodiments of the present invention. The wireless flight recordation system 100 is configured and operable for collecting black-box data of an aerial platform and transmitting the black-box data or at least parts thereof, via a wireless data communication network, to a receiver remote from the aerial platform (i.e. an aircraft or any other flying object).

The aerial platform itself is not shown in the figures, however relevant parts thereof are illustrated in the figures, including for instance:

the aerial platform's sensors $S_1$ to $S_N$, (e.g. cockpit sensors and/or flight sensors);

other optional equipment $BB_1$ to $BB_N$ (e.g. electronic equipment) of the aerial platform which is connected directly or indirectly to the aerial platform's sensors $S_1$ to $S_N$; the illustrated equipment $BB_1$ to $BB_N$ may include for example flight recorders of the aerial platform, and/or other equipment such as flight controllers/computers/sensor data processing modules cockpit equipment or any other equipment of the aerial platform which receives data/signals directly or indirectly from the sensors, before and/or after processing of such data/signals; and cable(s) 13A, 13A' and 13A", which are connected directly or indirectly to the sensors for communicating data/signals indicative of the measurements performed thereby, to the equipment $BB_1$ to $BB_N$ of the aerial platform.

To this end, FIGS. 1A to 1C illustrate several sensor groups $S_1$ to $S_N$ connected via respective cables 13A, 13A' and 13A" (e.g. data cables) to the equipment $BB_1$ to $BB_N$ of the aerial platform, which may optionally be flight recorders furnished on the aerial platform. The cables 13A, 13A' and 13A" provide data/signals indicative of measurements by the sensors, as well as the sensor (e.g. groups thereof) $S_1$ to $S_N$, are also shown in the figure to be connected directly or indirectly to the equipment $BB_1$ to $BB_N$. Without loss of generality, this data is also referred to herein as black-box data, and this is regardless of whether the equipment $BB_1$ to $BB_N$ is flight recorders or not, but merely to indicate that the data that is provided by said cables includes, or is indicative of, data that is conventionally considered suitable for recordation by flight recorders. In this regard the sensor groups $S_1$ to $S_N$ may be considered to include at least two groups of sensors: flight sensors (e.g. S1) and cockpit sensors (e.g. S2). The black-box data from the flight sensors (e.g. S1) may include for instance data indicative of acceleration, airspeed, altitude, flap settings, outside temperature, engine performance, actuator positions and cabin temperature, pressure and/or data from other sensors of the aerial platform. The black-box data from the cockpit sensors (e.g. S1) may include for instance audio data/signals recorded from the cockpit. It should be understood that the sensors are not necessarily divided into groups $S_1$ to $S_N$ the data of which is provided via respective cables, but other divisions and other cables arrangements with the sensors are possible without departing from the scope of the present invention. It should also be understood that the term black-box's data may refer to raw data provided from the sensors, or to data resulting from certain processing of the raw data measured by the sensors which may be conducted by some equipment (not specifically shown) on the aerial platform.

It should be noted here, that elements of the system 100 or of the aerial platform, which are illustrated in the figures by dashed lines, are optional elements, which, in various embodiments of the present invention, are not necessarily included in the system 100 or in the aerial platform.

According to the present invention, the system 100 includes at least one black-box data collector $BBDC_1$ (e.g. which is connected directly or indirectly to at least one group $S_1$ of one more sensors of the aerial platform) for collecting black-box data, being data conventionally considered suitable for recordation by one or more types of flight recorders; and at least one data transmission interface 10 connectable or connected to the at least one black-box data collector $BBDC_1$ for receiving the black-box data and transmitting the black-box data, or at least a parts thereof, via a wireless data communication network to a receiver remote from the aerial platform.

Typically, the aerial platform is equipped with two flight recorders, which are optionally furnished on the aerial platform, and are generally known as FDR (flight data recorder) and CVR (cockpit voice recorder). For clarity and without loss of generality, $BB_1$ and $BB_2$ may be considered to exemplify such flight recorders (although, it should be understood that $BB_1$ and $BB_2$ may represent other equipment and that the system 100 of the present invention may be adapted to operate even in cases where no flight recorders are furnished on the aerial platform). Accordingly, the at least one black-box data collector $BBDC_1$ may be for instance, connected to the sensor group $S_1$, which may include cockpit voice recording sensor(s) capable of collecting/measuring/sensing data for recordation by a CVR flight recorder; and/or to various flight sensor(s) $S_2$ capable of collecting/measuring/sensing data for recordation by an FDR flight recorder.

For clarity, the figures show optional additional black-box data collectors $BBDC_2$ to $BBDC_N$ connected directly or indirectly to additional sensor groups $S_2$ to $S_N$ of the aerial platform. The at least one data transmission interface 10 may be connected to all or some of the black-box data collectors $BBDC_1$ to $BBDC_N$ for transmitting the data collected thereby to the remote location/receiver.

FIG. 1A shows black-box data collector $BBDC_1$ in details with various possible optional elements/modules, which are included or connected thereto, to facilitate the black-box data collection by utilizing either the physical (direct or indirect) connection of the black-box data collector $BBDC_1$ to respective sensors $S_1$ of the aerial platform, or by utilizing a contactless interface, such as sniffing, to collect the data associated with the respective sensors $S_1$. In this regard, it should be noted that the black-box data collectors $BBDC_1$ to $BBDC_N$ may have similar or different configurations according to various embodiments of the present invention. For clarity, FIGS. 1B and 1C are provided to exemplify two different configurations of the black-box data collector $BBDC_1$.

For instance, FIG. 1B is provided to illustrate the configuration of the black-box data collector $BBDC_1$ with elements/modules that facilitate black-box data collection by utilizing the physical (direct or indirect) connection of the black-box data collector $BBDC_1$ to respective sensors $S_1$ of the aerial platform.

FIG. 1C is provided to illustrate the configuration of the black-box data collector $BBDC_1$ with the elements/modules facilitating black-box data collection from the respective sensors S1, by a contactless interface, such as sniffing.

The rest of the black-box data collectors $BBDC_2$ to $BBDC_N$ in FIGS. 1A to 1C are illustrated schematically and each may be configured and operable in any of the configurations of the black-box data collector $BBDC_1$ shown in FIGS. 1A to 1C, or as a combination of those configurations.

The at least one data transmission interface 10 of the system 100 is connectable/connected to one or more of the black-box data collectors $BBDC_1$ to $BBDC_N$ for receiving the black-box data collected thereby, and is configured and operable for:
  (i) establishing a wireless communication link with a wireless data communication network capable of providing data communication services to the aerial platform during flight; and
  (ii) transmitting said black-box data or at least a part thereof, via the wireless data communication network to a receiver remote from the aerial platform.

As indicated above, in some embodiments of the present invention, the black-box data collected by the one or more black-box data collectors (e.g. by $BBDC_1$ and $BBDC_2$) includes at least one of cockpit voice recording (CVR) data and flight data recording (FDR) data. In such embodiments the one or more black-box data collectors are configured and operable according to at least one of the following:
  at least one black-box data collector, e.g. $BBDC_2$, is connectable directly or indirectly to at least one or more flight sensors, e.g. $S_2$, of the aerial platform, for retrieving data therefrom and is adapted to process said data to obtain at least a portion of the FDR data in real time; and
  at least one black-box data collector, e.g. $BBDC_1$, is connectable directly or indirectly to one or more cockpit sensors, e.g. $S_1$, of the aerial platform for retrieving data therefrom and is adapted to process said data to obtain at least a portion of the CVR data in real time.

Accordingly, the data transmission interface 10 is adapted to receive, in real time, one or both of the portions of the FDR and/or CVR data obtained by the black-box data collectors (e.g. $BBDC_2$ and $BBDC_1$) and pack one or both of these portions of the FDR and/or CVR data for real time transmission to the remote receiver over the network.

To this end, in some implementations, one or more of the equipment $BB_1$, $BB_2$, ... $BB_N$ are flight recorders (hereinafter also referred to as black-boxes) furnished on the aerial platform, and the system 100 is configured and operable for collecting black-box data from the one or more flight recorders $BB_1$, $BB_2$, ..., $BB_N$.

The operational principles of black-boxes (flight recorders) $BB_1$, $BB_2$, ..., $BB_N$ are known per se and do not form a part of the present invention, and therefore need not be specifically described except to note that each black-box, e.g. $BB_1$ is typically connected to cable(s) 13A and optionally also to 13B which carry power supply and data(s) to be stored by the black-box $BB_1$. Optionally, the black box can have two input ports for connecting the black-box to two corresponding cables 13A and 13B, where one cable 13A carries the data to be stored by the black box $BB_1$, while another cable 13B provides/feeds the black-box with power supply. In FIGS. 1A to 1C, the details of the cables of the black-boxes $BB_2$ to $BB_N$ and the connection between the system 100 are illustrated schematically without separately depicting data and power cables (it should also be noted that the data and power cables 13A and 13B are not necessarily separated).

According to an embodiment of the present invention, at least one of the black-boxes $BB_1$, $BB_2$, . . . , $BB_N$ can be, for example, an FDR (Flight Data Recorder) and/or at least one of the black-boxes can, for example, be a CVR (Cockpit Voice Recorder). Accordingly, the data signals received by the FDR can be indicative, for example, of data regarding acceleration, airspeed, altitude, flap settings, outside temperature, engine performance, actuator positions and cabin temperature, pressure and/or data from other sensors of the aerial platform. The data signals received by the CVR can be, for example, audio data from the cockpit.

Referring now more specifically to the embodiment of FIG. 1B, at least one of the black-box data collectors of the system 100 (e.g. $BBDC_1$ in FIG. 1B) may be adapted to physically interface/connect with the cable 13A, which provides data feed of the respective sensor or sensor group (e.g. S1 in FIG. 1B), thereby receiving black box data from sensors of the aerial platform. To this end, the black-box data collector $BBDC_1$ implemented according to this embodiment, may include one or more signal splitters/duplicators HUB that are adapted to interface with the cable(s) 13A carrying data feed of the respective sensor group $S_1$. The signal splitter/duplicator HUB is connected to the black-box data collector $BBDC_1$ and to the cable(s) 13A and is adapted for duplicating/splitting digital or analog signals, which provide said data feed of the sensor group S1 (e.g. the cable(s) 13A may be any cable of the aerial platform that provides such data feed to any equipment in the aerial platform, such as to a conventional flight recorder). The signal splitter/duplicator HUB duplicates the signals/data feed that is communicated through the cable and communicates a duplicate of at least a part thereof to the black-box data collector $BBDC_1$.

For instance, the aerial platform may include equipment, such as flight recorder BB1 (which may be for instance CVR and/or FDR), receiving data feed directly or indirectly from a group of sensors S1 being flight sensors and/or cockpit sensors, via cable(s) 13A, being black-box cable(s). The signal splitter/duplicator HUB may be adapted to duplicate the signals of the black-box cable(s) 13A, and communicate a duplicate of at least a part thereof to the black-box data collector $BBDC_1$, thereby indirectly receiving the black box data from sensors S1 providing a backup of said data to the black-box data collector $BBDC_1$ of system 100, (which then transmits it to the remote receiver for storage).

Referring now more specifically to the embodiment of FIG. 1C, at least one of the black-box data collectors of the system 100 (e.g. $BBDC_1$ in FIG. 1B) may be adapted to interface with the cable 13A, which provides data feed of the respective sensor or sensor group (e.g. S1 FIG. 1B), by utilizing a contactless/signal-sniffing interface to receive black-box data from sensors of the aerial platform. The black-box data collector $BBDC_1$ may include at least one black-box data sniffer BBS1. Each black-box data sniffer such as 11A is adapted to implement the contactless interface with the cables 13A carrying the data feed/signals of the sensors (e.g. implementing the contactless interface with one or more black-box cables). For example, each black-box data sniffer BBS1 is associated with a respective black-box cable of a flight recorder and is adapted to sense signals, which are communicated through the cable to provide data feed to the flight recorder. The black-box data sniffer BBS1 is adapted to perform such sensing of the signals through the cable, from outside said cable and without physically or electromagnetically interfering with the cable or the signals communicated therethrough.

In the embodiment of FIG. 1C, the black-box data collector $BBDC_1$ of the system 100 (and optionally other black-box data collectors thereof) is generally configured as a passive non-disruptive system, adapted to collect/intercept black-box data and/or power supply information, without disrupting the installation/configuration of the equipment $BB_1$ (e.g. flight recorder) to which it is electrically connected and/or its respective cable(s). Accordingly, optionally also other black-box data collectors, such as $BBDC_2$ to $BBDC_N$, which are connected to equipment/flight-recorders $BB_2$ to $BB_N$ may be configured in the same way to function as passive non-disruptive data collection systems, in which case the entire system 100 operates without disrupting the data and/or the power supply provided to the equipment/flight-recorders $BB_1$, $BB_2$, . . . , $BB_N$ and without affecting the ongoing/fluent operation of the thereof, as described more specifically further below.

Thus, in the embodiment that is specifically illustrated in FIG. 1C, the system 100 includes inter alia such main structural and functional units as one or more BB sniffers (black-box sniffers) $BBS_1$, $BBS_2$, . . . , $BBS_N$ for collecting/sensing data recorded by one or more respective black-boxes, and a transmission interface 10 connected to the BB sniffers for receiving the data collected by the BB sniffers $BBS_1$, $BBS_2$, . . . , $BBS_N$ for transmission of said data to a remote receiver. The transmission interface 10 may include a transmitter 17 or may be connectable to an external transmitter 17', and is configured for operating the transmitter, 17 or 17', for transmitting the black-box data to a receiver (not shown) remote from the aerial platform.

The BB sniffers $BBS_1$, $BBS_2$, . . . , $BBS_N$ are configured for collecting data being provided and communicated to the one or more black-boxes $BB_1$, $BB_2$, . . . , $BB_N$ of the aerial platform. Each BB sniffer $BBS_1$, $BBS_2$, . . . , $BBS_N$ is connected to/associated with a corresponding black-box of the one or more black-boxes $BB_1$, $BB_2$, . . . , $BB_N$. More specifically each BB sniffer is configured for collecting data in the vicinity of a cable providing data to the corresponding black-box, as described further below.

As shown, FIG. 1C describes in detail only one of the BB sniffers, for example the BB sniffer $BBS_1$. It should however be understood that the other BB sniffers $BBS_2$, $BBS_3$ . . . , $BBS_N$ are configured similarly to the BB sniffer $BBS_1$ and may have the same structural configuration and/or functions as the BB sniffer $BBS_1$.

As shown, each BB sniffer $BBS_1$ includes at least one non-disruptive signal sniffer 11A arranged in the vicinity of the respective cable/input port of the black-box $BB_1$ and for sensing electromagnetic fields/signals in said vicinity to obtain measured data indicative of the data/power communicated to the respective black-box $BB_1$ and at least one noise filtration processor 12 connected for receiving the measured data from the non-disruptive signal sniffer 11A and applying suitable filtration thereto, as described in more detail below.

More specifically, typically each of the one or more non-disruptive signal sniffer(s) 11A-11C may be configured for sensing and measuring electromagnetic fields/signals of one or more frequency ranges in the vicinity of the black-box's cable 13A carrying the data to the respective black-box $BB_1$ and for obtaining measured data indicative of the data/power communicated via said cable. Generally, the one or more frequency ranges are frequency ranges at which the data/power is communicated to the respective black-box. Thus, the system 100 is capable for passively collecting black-box data of different types of black-boxes receiving data/power at various frequencies. To this end, the measurement (measured data) by each of the non-disruptive signal sniffer(s) 11A to 11C is indicative of at least a part of the data communicated via the cable 13A for recording by the respective black box $BB_1$.

In this connection, it should be noted that different types of black-boxes can optionally receive data/power (via their corresponding cable(s)) at different frequency ranges. In some embodiments, the non-disruptive signal sniffer(s) 11A to 11C may be configured to provide adjustability/tunability to various types of black-boxes. More specifically, in some implementations, the non-disruptive signal sniffer(s) 11A to 11C may be adjustable, or a-priori selected/adapted to sense/measure electromagnetic fields/signals of different frequency ranges associated with various types of black-boxes for obtaining measured data indicative of the data/power communicated thereto via their respective cables.

Typically, each non-disruptive signal sniffer, such as 11A, is configured to be disposed in a proximity to one of the cables: 13A (being the data cable of the respective black-box BB1), or the 13B (the optional power cable of the respective black-box BB1—in case such separate power cable exists 13B—i.e. power is not provided to the black-box via the data cable 13A, and in case the power supply to the black-box needs to be monitored). More specifically, the non-disruptive signal sniffer 11A is arranged at a certain distance from the cable 13A close enough to enable proper measuring of the electromagnetic signals/fields in the vicinity of the cable 13A, e.g. at region R1 thereof (without disrupting these data signals carried by the cable 13A). It should be understood that the non-disruptive signal sniffer 11 is disposed in proximity to the cable 13A such that it enables passively measuring/sensing of the electromagnetic signals/fields in the vicinity of said cable (i.e. the electric or magnetic fields surrounding the cable), thereby obviating the need for direct electrical contact between the non-disruptive signal sniffer 11A and the cable 13A or the black box $BB_1$. Consequently, the non-disruptive signal sniffer 11A measures/senses the electromagnetic signals/fields without affecting operation of the black-box, i.e. without cutting/harming the cable 13A in any way and without electrically connecting the non-disruptive signal sniffer 11A to the cable 13A or the black-box $BB_1$ via wires or wireless communication. Additional non-disruptive signal sniffers such as 11B and 11C may be connected to the same BB sniffer $BBS_1$ and arranged at different regions thereof such as R2 and R3 along the cable 11A. Alternatively or additionally, in the same manner, one or more of the non-disruptive signal sniffers, such as 11D, may optionally be arranged at one or more regions e.g. R1, R2 and/or R3, of the power cable 13B for non-disruptive sensing of the power supply to the black-box $BB_1$. Accordingly, the system 100 can be implemented/installed in an aerial platform as a stand-alone (passive) system for measuring data and/or power of an existing black-box, without dismantling and/or reinstalling the black-box itself, or disconnecting/cutting the cables communicating the data to the black-box or interfering with data communicated to the black-box via said cables.

The non-disruptive signal sniffers, e.g. 11A to 11C and 11D, are generally configured as a silent/passive sniffer, which do not generate any interfering signals that may disrupt the data/power carried by the cable 13A and/or 13B.

More specifically, non-disruptive signal sniffers 11A to 11D are configured not to communicate with the respective black-boxes whose data power they are adapted to sense/monitor, and do not exchange any signals or data therewith. Thus, the measured data is obtained by the non-disruptive signal sniffers 11A to 11C without disrupting/interfering with the data carried by the cables 13A and 13B and without affecting the fluent operation of the black-box $BB_1$.

Figure 2:
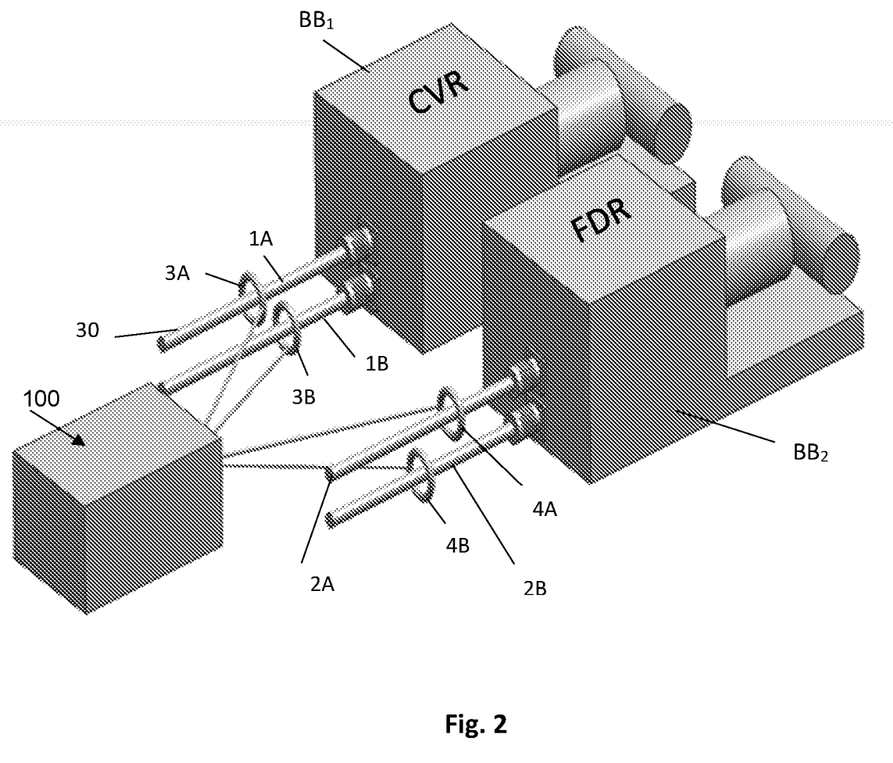
FIG. 2 is a schematic illustration of a wireless flight recordation system 100 according to an embodiment of the present invention.

The following discusses in more detail the configuration and operation of one non-disruptive signal sniffer 11A of the system, coupled to a certain region R1 of the data and optionally also power, cable 13A of the black-box BB1. It should be understood that other non-disruptive signal sniffers, e.g. 11B and 11C of the system, may be configured similarly as described below or above with reference to the non-disruptive signal sniffer 11A, and may be arranged near the data or power cables 13A and 13B. According to an embodiment of the present invention, the non-disruptive signal sniffer 11A is accommodated in a vicinity of a circumference of at least a portion R1 of a continuous section (un-cut section) of the cable 13A. Such a configuration of the non-disruptive signal sniffer 11A is exemplified below with reference to FIG. 2. The passive measurement of the electromagnetic signals/fields in the vicinity of the cable 13A can be carried out, for example, via magnetic inductance or electric capacitance. To this end, the non-disruptive signal sniffer 11A can further include an inductive sniffing module which can have one or more induction loops furnished to surround a portion of the cable 13A thereby sensing/measuring magnetic fields in the vicinity of said cable, as shown in FIG. 2. Alternatively or additionally, the non-disruptive signal sniffer 11A may have a capacitive sniffing module having one or more electrodes arranged along said cable, in the vicinity of the circumferences thereof for measuring said electric fields near the cable.

It should be understood that the data (to be measured by the non-disruptive signal sniffer 11A) is typically communicated through the cable 13A at certain predetermined frequencies or frequency range indicated herein as "predetermined data frequency range". In other words, the predetermined data transmission frequency range is indicative of frequencies by which the data is communicated through the cable 13A.

In general, the cable 13A may deliver/carry electromagnetic signals of various frequencies/frequency ranges, including not only signals of the predetermined data frequency range, but signals of other frequencies/frequency ranges as well. For example, the cable 13A and/or the cable 13B may also be adapted to carry power supply signals at a certain predetermined frequency range, typically different from the data frequency range, to the black-box $BB_1$ as described further below. Thus, the one or more frequency ranges of the electromagnetic fields measured by the non-disruptive signal sniffer 11A include at least one predetermined data transmission frequency range indicative of frequencies at which the measured data is communicated through the cable 13A to the black-box $BB_1$.

As further exemplified in FIG. 1C, the non-disruptive signal sniffer 11A may also include a frequency filter 14A. The frequency filter 14A is adapted to apply frequency filtration processing to the electromagnetic fields measured by the non-disruptive signal sniffer 11A to extract electromagnetic fields of the predetermined data/power transmission frequency range(s) from the electromagnetic fields of the various frequency ranges being measured by the non-disruptive signal sniffer 11A. In other words, the frequency filter 14A extracts/isolates only those frequency ranges which match/fit with the data/power communicated through the respective cables to the respective black boxes.

Generally, each black-box may receive the data/power signals via more then one cable which may be a similar type of cable(s) as cable 13A or cable(s) of other type(s). In this case, a corresponding non-disruptive signal sniffer 11A is disposed in proximity to each such cable for passively measuring electromagnetic signals/fields generated in the vicinity of the corresponding cable for obtaining measured data indicative of the data/power communicated via said cable.

The at least one noise filtration processor 12 is in data communication with the non-disruptive signal sniffers 11A-11C (e.g. at least with those associated with the same cable such as 13A), for obtaining/receiving the measured data therefrom. The noise filtration processor 12 is configured for applying noise filtering to said measured data as to obtain noise filtered signals indicative of at least part of the data provided to the black-box $BB_1$ for recording therein, via the cable 13A.

In an example, as shown in FIG. 1C, the BB sniffer $BBS_1$ may include one non-disruptive signal sniffer 11A arranged near each cable, or several non-disruptive signal sniffers 11A to 11C arranged along such a cable, e.g. at respectively different spatially spaced apart regions R1 to R3 of the cable. The case of several non-disruptive signal sniffers 11A to 11C, provides for measuring electromagnetic fields of one or more frequency ranges in the vicinity of the respectively different spatially spaced apart regions thereof. Such embodiments may take advantage of the fact that the measured data obtained from each non-disruptive signal sniffer of 11A to 11C that are arranged along the same cable 13A, includes a similar component being the signal of interest part of the measurement by the non-disruptive signal sniffer (that is being indicative of said at least part of the data communicated through the cable) and practically non-similar components which are associated with the noise/clutter part that is sensed by the non-disruptive signal sniffer of 11A to 11C from the vicinities of the different spaced apart regions of the cables (i.e. not originating from the data/power communicated through the cable 13A). To this end, the signal of interest components of the measured data obtained by the plurality of the non-disruptive signal sniffers, originate from (or are indicative of at least part of the data and/or power communicated through the cable), and are therefore respectively highly correlated with one another. The noise/clutter components of the measured data obtained by the plurality of the non-disruptive signal sniffers are generally different in the different respective spaced apart regions of the cable and are therefore associated with substantially lower correlation between them, and may be considered to be not correlated. In turn, in such embodiments the noise filtration processor 12 may include correlation analyzer 16 configured and operable to exploit this feature of lower correlation of the noise/clutter and higher correlation of the data, measured by the plurality of spatially distributed non-disruptive signal sniffers 11A to 11C for accurate extraction of the data and filtration of the noise/clutter. The noise filtration processor 12 is in communication with said plurality of the non-disruptive signal sniffers 11A to 11C for obtaining the measured data therefrom, and the correlation analyzer 16 is configured and operable to apply noise filtering by carrying out at least a correlation processing between the measured data obtained from the plurality of the non-disruptive signal sniffers 11A to 11C to extract the highly correlated part of the measured data and consider this part as indicative of the noise filtered signals representative of at least part of the data communicated through the cable. For instance, correlated parts (e.g. spectral components) of the measurements whose autocorrelation (e.g. cross-correlation between said parts) equals or exceeds a certain correlation threshold may be considered as signals of interest, while less correlated parts of the measurements whose autocorrelation is below the threshold, may be considered as noise.

The noise filtration process is carried out by the noise filtration processor 12 in accordance with a predetermined protocol (e.g. a priorly known format/pattern/modulation) by which the data is communicated to the black-box $BB_1$ via the cable 13A. To this end, the protocol analyzer 15 can be coupled to/be in communication with a memory MEM configured for storing data indicative of this predetermined protocol.

The noise filtration processor 12 may include a protocol analyzer 15 adapted for processing the measured data in accordance with the predetermined protocol to identify portions of the measured data, which comply with said protocol, and filter out noise portions of the measured signals which are not compliant with said protocol. As a result of the noise filtration process, the protocol analyzer 15 obtains the noise filtered signals.

The predetermined protocol may be for example indicative of at least one predetermined/reference modulation/pattern, by which the data is communicated to the corresponding black box. The noise filtration processor 12 is further adapted to apply processing to the measured data to identify portions thereof, which are compliant/matching with the modulation/pattern. The predetermined/reference modulation/pattern may for example be indicative of parameters of one or more of the following modulation schemes:

parameters of Continuous Wave Modulation—by which data is transmitted over the cable. This may include parameters of an Amplitude Modulation and/or parameters of an Angle Modulation (e.g. of phase modulation and/or frequency modulation), by which data is encoded on the signal of the cables.

parameters of Pulse Modulation—by which data is transmitted over the cable. This may include parameters of a digital pulse modulation, such as Pulse Code Modulation (PCM), e.g. Delta modulation, and/or parameters of an analog pulse modulation, such as Pulse-Amplitude Modulation (PAM) and/or Pulse-Width Modulation (PWM) and/or Pulse-Position Modulation (PPM) parameters of an Angle Modulation (e.g. of phase modulation and/or frequency modulation), by which data is encoded on the signal of the cables. A person of ordinary skill in the art will readily appreciate the parameters of the above mentioned modulation types. The protocol analyzer 15 may be configured and operable for obtaining such modulation parameters (e.g. as given reference data which may be stored internally in a memory storage MEM of the system or received from afar over the communication network. Accordingly, the protocol analyzer 15 may be configured and operable to process the signals sensed by the non-disruptive signal sniffers 11A to 11D utilizing said parameters in order to distinguish between: (a) signal portions implementing the specific modulation scheme/parameters, which are used as reference, and consider such signal portions as part of the signal of interest which is communicated through the cable; and (b) signal portions not implementing the specific modulation scheme/parameters, which may therefore be considered as noise.

It should be understood that the signal portions processed in this way may be analog signal portions (e.g. raw signals sensed by analog means of the non-disruptive signal sniffers and processed that way by an analog filtration circuit of the protocol analyzer which may include frequency filters, mixers, delay lines and/or various other components which may be used and possibly adjusted to diminish signal portions not implementing the reference modulation parameters, and possibly amplifying those portions which do implement the reference parameters. For that matter, the signal portions may refer to time portions of the sensed signals or frequency portions thereof, or any other suitable representation to which the sensed signals may be converted.

Alternatively or additionally, the signal portions processed in this way may be digital signal portions (e.g. digital signals sensed as such by digital sensing means of the non-disruptive signal sniffers or after digitization of the sensed signals, e.g. by suitable A/D converter(s)) and processed that way by a digital filtration process/processor of the protocol analyzer, which may include a designated or general digital signal processing circuit, or a computer implemented processing scheme, configured and operable for removing signal portions not implementing the reference modulation parameters, and possibly extracting those portions which do implement the reference parameters. For that matter, as mentioned above, the signal portions/samples may refer to time portions of the sensed signals or frequency portions thereof, or any other suitable representation to which the sensed signals may be converted.

Thus, in case the modulation pattern/parameters based filtration is used by the protocol analyzer 15, the remaining measured data/signal portions in the noise filtered signals, after such modulation pattern/parameters based filtration, will generally include substantially only those identified portions that are compliant/matched with the modulation/pattern.

Apart from the above described modulation pattern based filtration, which may or may not be implemented by the protocol analyzer 15, the predetermined protocol may alternatively or additionally be also indicative of at least one predetermined packet format characterizing a predetermined structure of transmission packets included in the data. To this end, regardless of whether modulation based filtration is carried out or not, the protocol analyzer 16, or another analogue or digital processor preceding the protocol analyzer 16, such as exemplified demodulator 14B, may be adapted to demodulate the sensed signal to obtain demodulated signal portions (the demodulation may be performed before or after their optional frequency filtration by the filter 14A, and before or after the optional correlation filtration by the optional correlation analyzer 16). The demodulation may be carried out according to any known in the art analog or digital technique, and may be performed based on a-priori or dynamically set reference modulation parameters of the specific modulation scheme used. The demodulated signal portions may represent the raw transmitted data transmitted through the cable, plus additional noise which may not have been filtered by any of the above described preceding filtration schemes which may have been used (e.g. frequency, correlation and modulation based filtration schemes). Typically, although not necessarily, the demodulated signal/data portions are represented at this stage in digital format.

The protocol analyzer 15 of the noise filtration processor 12 may be adapted to apply processing to the measured data and/or to the demodulated portions thereof to identify data portions which are compliant with the predetermined/reference packet format by which the data is to be communicated over the cable 13A to the black-box BB1. The protocol analyzer 15 may be configured and operable for obtaining such reference packet format data (e.g. as given reference data which may be stored internally an a memory storage MEM of the system or received from afar over the communication network) and may be configured and operable to process the measured data and/or to the demodulated portions thereof based on the reference packet format data to identify parts portions of the measured data which comply with the packet format and/to correct or reject measured data not compliant with the reference packet format, which may be considered as either noise or slightly defected data whose defects are correctable. For instance, the reference packet format data may include data indicative of headers and checksums internal to data packets by which data is communicated to the black boxes, as well as data on control packets, such as pilots and spacers which may be communicated in between data packets. The protocol analyzer 15 may be adapted to utilize the reference headers and checksums to authenticate and verify the data communicated via data packets, and possibly also to correct for slight defects in the measured signals/data whose correction is possible by utilizing data of the header and/or checksum. The protocol analyzer 15 may be also be adapted to utilize the reference packet format data for identifying control packets if such are communicated, in order to determine various parameters of the operation of the respective black-box.

Thus, the optional protocol analyzer 15 may be adapted to perform any or both of two types of protocol based processing to extract and authenticate/validate the data communicated through the black-box's cable(s) 13A and/or 13B:
  i. Modulation based processing and filtration based on reference data related to the modulation scheme by which the signals are communicated through the cable(s);
  ii. Packet based processing and filtration and/or correction based on reference data related to the packet format by which the data carried by said communicated signals, is packed.

Apart from that, other filtration operations may be conducted as described above, including frequency filtration (e.g. based on reference data indicative of the frequencies e.g. carrier and/or modulation frequencies) by which the signals are communicated through the cable—see discussion of module 14A above; as well as correlation filtration between the measurements of several of non-disruptive sniffers, if such are arranged along the same cable—see discussion on module 16 above.

As a result of one or more of such filtrations, the noise filtration processor 12 of the black-box sniffer BB1 outputs noise filtered signals/data which may be considered as reliably reflecting the black-box data, and possibly also the power, which are communicated via the cable(s) 13A and/or 13B, to respective the black-box BB1.

In turn, the transmission interface 10 is configured to obtain the noise filtered data/signals from each BB sniffer of the system, e.g. from the BB sniffer $BBS_1$ (e.g. from the noise filtration processor 12 thereof, and to process the noise filtered data/signals for generating transmission signals/packets including data indicative of the at least part of the black-box data of the black-boxes with which the system is associated, e.g. $BB_1$ to $BB_N$. This may be performed according to any suitable data transmission protocol, by which the transmitter 17 or 17' may be configured to communicate with the remote receiver. Accordingly, the transmission interface 10 is also configured for providing the transmission signals/packets to the transmitter 17 for transmission to the remote receiver.

As indicated above, the system 100 is generally configured as a passive non-disruptive system adapted to collect/intercept power supply information. Accordingly, the BB sniffer $BBS_1$ is also configured and operable for measuring/collecting data indicative of a power supply which is provided to the respective black-box $BB_1$. As shown in FIGS. 1A to 1C, the BB sniffer $BBS_1$ may also include a power state processor 18 adapted to receive the data indicative of the power supply, and process said data in order to determine a power state of the black-box $BB_1$. According to this embodiment, the transmission interface 10 is further configured for obtaining and processing the power supply data. Accordingly, the transmission interface 10 transmits the transmission signals which include data indicative of the at least part of the black-box data, and data indicative of the power supply, to the remote receiver.

As mentioned above, in general, a black-box can be fed with power supply via the same cable which provides data to the black-box, or can be fed with power supply via another separate cable. As shown in FIGS. 1A to 1C, the power supply may also be provided (along with the data) to the black-box $BB_1$ via one cable 13A. In this case, the non-disruptive signal sniffer 11A is further configured for sensing electromagnetic fields/signals in the vicinity of the cable 13A to obtain measured data indicative of the power supply provided to the respective black-box $BB_1$. As mentioned above, these electromagnetic fields (sensed/measured by the non-disruptive signal sniffer 11A) are of one or more frequency ranges. Accordingly, said one or more frequency ranges include at least one power supply frequency range indicative of frequencies by which the power supply is provided via the cable 13A to the corresponding black-box $BB_1$.

Alternatively, the power supply may be provided separately from the data to the black-box $BB_1$, namely via another cable 13B. Accordingly, the BB sniffer $BBS_1$ may also include a power supply sniffer 11D disposed in proximity of the respective cable 13B carrying the power supply to the respective black-box $BB_1$. The power supply sniffer 11D is configured for sensing/measuring electromagnetic fields/signals in the vicinity of the other cable 13B to obtain measured data indicative of the power supply provided to the respective black-box $BB_1$. To this end, the supply sniffer 11D is configured for sensing/measuring electromagnetic fields of one or more frequency ranges in the vicinity of the black-box's other cable 13B carrying the power supply to the respective black-box $BB_1$. The one or more frequency ranges include at least one predetermined power supply frequency range (i.e. DC and/or AC) at which the power supply is provided to the respective black-box $BB_1$.

It should be noted that the power supply sniffer 11D may be configured and operable in a similar manner as non-disruptive signal sniffer 11A discussed in detail above, to operate as a passive non-disruptive sniffer that has no electrical contact with the cable 13B and does not disrupt/affect the power supply provided via said cable to the respective black-box $BB_1$.

Accordingly, the frequency filter 14A is further adapted to apply a frequency filtering processing which includes extracting at least a portion of the electromagnetic fields being measured by the power supply sniffer 11D, which is associated with the predetermined power supply frequency range. These measured electromagnetic fields associated with the power supply are then provided to the power state processor 18 for processing in order to determine the power state of the black-box $BB_1$.

It should be noted that the power state processor 18 may generally be configured and operable similarly to the noise filtering processor 12 as described above with various alternative implementations thereof, and may be configured as a part of the noise filtering processor 12 or as a separate module, and may be dedicated to implement the above function of the noise filtration processor based only on the parameters of the power supply to the black-box.

Optionally, the system 100 may also include an input port 20 which may otherwise be referred to as a positioning system (PS) connection. The PS connection 20 can be connected directly or indirectly to a GPS antenna (e.g. of the aerial platform) or to other positioning equipment, such as an inertial navigation/positioning system, (e.g. which may be of the aerial platform or other), for receiving positioning signals (e.g. from the GPS satellite/s or the inertial navigation/positioning system) indicative of position of the aerial platform. In turn, the transmission interface 10 may be also configured and operable for obtaining and processing the positioning signals to include data indicative thereof in the transmission signals/packets that are being transmitted to the remote receiver so that each packet may be tagged with the position of the aerial platform at which the data it carries was communicated to the black-box.

According to some embodiments of the present invention, the transmission interface 10 and/or the transmitter 17 or 17', are configured and operable to encrypt the transmission signals.

According to some embodiments, the transmitter 17 or 17' is configured to transmit the transmission signals via satellite communication to a gateway, by which the transmission signals are processed, stored, and/or further forwarded to the remote receiver. For example, the transmitter 17 or 17' may be configured and operable for broad-band satellite communication, including at least one of 5G communication or star-link.

Reference is now made to FIG. 2 which shows a schematic illustration of the system 100 of FIG. 1C implemented in an aerial platform (e.g. an airplane) according to an embodiment of the present invention. As can be seen, the aerial platform has a typical flight recording system comprised of two black-boxes $BB_1$ and $BB_2$, where the black-box $BB_1$ is an FDR (Flight Data Recorder) and the black-box $BB_2$ is a CVR (Cockpit Voice Recorder). Each black-box is connected to two cables, one for communicating data to the respective black-box, and another cable for providing power supply thereto. In particular, the black-box $BB_1$ is connected to cable 1A communicating the data to the black-box $BB_1$ and to another cable 1B providing power supply thereto. Similarly, the black-box $BB_2$ is connected to cable 2A communicating the data to the black-box $BB_1$ and to another cable 2B providing power supply thereto.

As mentioned above, the system 100 of FIG. 1C is configured as a non-disruptive system adapted to collect/intercept black-box data and/or power supply information of the two black-boxes $BB_1$ and $BB_2$ passively, i.e. without disrupting the operation of said black-boxes and without being in direct electrical contact with the black-boxes $BB_1$ and $BB_2$ themselves and/or their respective cables 1A, 1B, 2A and 2B. The system 100 can be installed in the aerial platform as a stand-alone system without the need for reconfiguring/reinstalling the black-boxes, and without intervening/disrupting the fluent operation thereof.

In this embodiment, the system 100 includes two BB sniffers (not shown), each BB sniffer being connected to the corresponding black-box $BB_1$ and $BB_2$ for collecting data being communicated to the black-boxes for storage therein.

As mentioned above, each BB sniffer is configured for collecting data and/or power in the vicinity of the corresponding cable providing the data or power to the corresponding black-box. To this end, each BB sniffer utilizes two non-disruptive signal sniffers, each disposed in the vicinity of the respective cable of the black-boxes $BB_1$ and $BB_2$ for sensing electromagnetic fields/signals in said vicinity, to obtain measured data indicative of the data and/or power communicated to the respective black-boxes $BB_1$ and $BB_2$. In particular, non-disruptive signal sniffers 3A and 3B measure the electromagnetic fields/signals in the vicinity of the cables 1A and 1B, correspondingly, to obtain measured data indicative of the data and/or power communicated to the respective black-boxes $BB_1$. Non-disruptive signal sniffers 4A and 4B measure the electromagnetic fields/signals in the vicinity of the cables 2A and 2B correspondingly, to obtain measured data indicative of the data and/or power communicated to the respective black-boxes $BB_2$.

In the specific non-limiting example of FIG. 2 all the non-disruptive signal sniffers 3A, 3B, 4A and 4B are configured and operable to sense the magnetic fields surrounding the cable. To this end, in this specific example, each of these non-disruptive signal sniffers includes at least one conducting loop arranged near/about the circumference of the respective cable and configured for sensing the magnetic flux through the loop. The latter, in turn, provides sensed signals indicative of the data/power transmitted through the cable. In this regard, it should be noted that the technique of the present invention is not limited by the technique of sensing of the electromagnetic fields near the cable, and the non-disruptive signal sniffers may be implemented with various types of sensors which may utilize various phenomena for sensing any one or both of magnetic and electric fields near the respective cables. Magnetic fields may be measured/sensed with various types of sensors as known in the art, such as: conducting loops as illustrated in the figure, hall-effect sensors, SQUID sensors, vapor-cell based sensors, optical magnetic field sensors such as ring resonators, or Faraday effect based sensors and/or optical sensors based on magnetic fluid or magnetostrictive materials, or by various antenna configurations such as electric dipole. Alternatively or additionally, electric fields may be sensed utilizing the arrangement electrodes/capacitors forming capacitive electrode pairs arranged near/along the cable, by optic or photonic E-field sensors utilizing sensing elements such as electric-optic crystal, piezoelectric materials, and electrostatic attraction, and/or by various antenna configurations such as magnetic dipole. Generally the non-disruptive signal sniffers 3A, 3B, 4A and 4B, as well as those illustrated in FIGS. 1A and 1C above, may be configured and operable as any of the above electric and/or magnetic field sensing techniques or combinations thereof, or any other magnetic and/or electric field technique, as would readily be appreciated by those versed in the art, as long as it is capable of sensing the electric or magnetic fields surrounding the cable with sufficient accuracy and sensitivity. Indeed, the present invention may be implemented with the sensing of only the magnetic field or only the electric field near one or more regions of the cable. However, as indicated above, in some implementations, several non-disruptive signal sniffers may be arranged in the vicinity of the same cable, and their measurements may be correlated or summed (possibly with appropriate delays according to the distance between them), in order to enable accurate differentiation between correlated measurements between different regions of the cable, which may be attributed to the data/power communicated through the cable, and non-correlated measurements attributed to noise. Also, as the electric and magnetic fields of the signals communicated through the cable are generally substantially correlated, one type of sensor, e.g. for sensing either magnetic or electric fields, may be the non-disruptive signal sniffers arranged near each cable (since it may generally be sufficient to estimate either the electric part or the magnetic part of the signals through the cable in order to determine the signals). Alternatively or additionally, for the same reason that the electric and magnetic fields of the signals communicated through the cable are substantially correlated, it is also possible to use a combination of several non-disruptive signal sniffers arranged near at least one of the cables, whereby the several non-disruptive signal sniffers may be configured similarly to employ magnetic field sensing or electric field sensing, or some of them employing magnetic field sensing and others electric field sensing, and the relation between said magnetic and electric field sensing may then be correlated (e.g. by introducing proper phase shifts) to be represented on common ground (in a common signal space).

Thus, in the present non-limiting example of FIG. 2, each non-disruptive signal sniffer is configured to sense magnetic fields of at least one predetermined frequency range being indicative of the data/power communicated via the respective cable. In particular, the non-disruptive sniffers 3A and 4A measure electromagnetic fields/signals corresponding to at least one predetermined data transmission frequency range at which the data is provided to the black-boxes $BB_1$ and $BB_2$ via the corresponding cables 1A and 2A. The non-disruptive sniffers 3B and 4B measure electromagnetic fields/signals corresponding to at least one predetermined power supply frequency range at which the power is provided to the black-boxes $BB_1$ and $BB_2$ via the corresponding cables 1B and 2B.

Each of the non-disruptive signal sniffers 3A, 3B, 4A and 4B is placed/disposed in proximity to the corresponding cable carrying data/power to the corresponding black-boxes $BB_1$ and $BB_2$, without being in direct electrical contact with said cable, thereby enabling said sensing without disrupting the data/power communicated through the cable. In this specific example, each non-disruptive signal sniffer is accommodated at a circumference of a continuous section (un-cut section) of the corresponding cable for measuring the magnetic field through the circumference.

More specifically, each non-disruptive signal sniffer at least partially encircles at least a portion of the continuous section of the corresponding cable. For example, the non-disruptive signal sniffer 3A is accommodated at the circumference of a continuous section 30 of the corresponding cable 1A. As can be seen in FIG. 2, the non-disruptive signal sniffers 3A, 3B, 4A and 4B are ring-shape sniffers, however, as indicated above, other types or shapes of the non-disruptive signal sniffer may be used for sensing the electric and/or magnetic fields near the cable. Each non-disruptive signal sniffer can further have an inductive sniffing module (not shown) including a plurality of induction loops surrounding the circumference of the continuous section of the corresponding cable for sensing the electromagnetic fields/signals via magnetic induction. Additionally, or alternatively, each non-disruptive sniffer may further include a capacitive sniffing module including a plurality of electrodes arranged in the vicinity of the continuous section of the corresponding cable.

Figure 3:
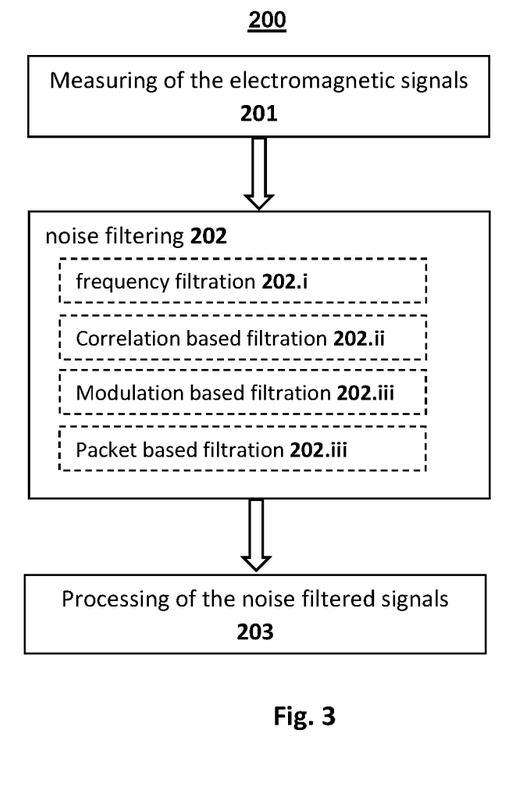
FIG. 3 is a flowchart of a method 200 for remote backup of black-box data from an aerial platform.

According to one broad aspect of the present invention, FIG. 3 shows a flow-diagram depicting a method 200 for remote backup of black-box data from one or more black-boxes in an aerial platform. The method 200 generally provides for passively collecting/intercepting black-box data and/or power supply information, without disrupting the black-box installation, configuration and/or operation. More specifically, the method 200 allows sensing of electromagnetic fields/signals in the vicinity of one or more cables which carry data or power signals to the respective black-box(es) to obtain measured data indicative of the data/power communicated to said black-box(es). Consequently, the method 200 allows collection/interception of black-box data/power supply information without interfering with said one or more cables and without dismantling and/or reinstalling the black-box(es) itself.

As shown in FIG. 3, the method 200 includes measuring electric and/or magnetic fields/signals 201 of one or more frequency ranges in the vicinity of a cable carrying data for input to/for recording by a respective black-box of the aerial platform, thereby obtaining measured data indicative of the data/power communicated to said black-box(es). The measured data is indicative of at least part of the data communicated through the cable for recording by the at least one black-box. The measuring is performed externally to the cable which carries the data/power to the respective black-box. In particular, the measured data is obtained by passively measuring the electromagnetic signals of the one or more frequency ranges in the vicinity of the cable carrying the data/power. The measurements may be carried out by any one or more suitable electric and/or magnetic field sensors arranged at one or more regions near the cable and functioning as non-disruptive signal sniffers. As indicated above, the electric and/or magnetic field sensors may implement any suitable electro/magnetic sensing technique. Magnetic fields may be measured/sensed with various types of sensors as known in the art, such as: conductive loops, arrangement electrodes/capacitors, hall-effect, SQUID sensors, vapor-cell sensors, optical/photonic sensors (ring resonators or Faraday effect based), piezoelectric sensors, and/or by various antenna configurations. The sensors are non-disruptive in the sense that their configuration and operation does not, and need not, interrupt the structural integrity of the cable, and do not emit/affect electromagnetic fields, or affect only small electromagnetic disturbance that does not cause disruption to the data/power carried by the cable. Such passive sensing/measuring of the electromagnetic fields allows for obtaining the measured data/power information without disrupting the data and/or the power supply (i.e. without affecting the data signals or the power supply) provided to the black-boxes, and without affecting the ongoing/fluent operation of the black-boxes.

To this end, in some implementations of the method 200 the signals (data or power being communicated to the black-box) are collected/sensed by measuring electromagnetic signals/fields of various frequency ranges in the vicinity of the cable(s). The measuring of the electromagnetic signals can be carried out, for example, by measuring the magnetic field in the vicinity of the cable(s) carrying the data/power signals to the black-box(es) (e.g. via magnetic induction), or/and by measuring the electric field in the vicinity of said cable(s).

The method 200 also includes applying proper noise filtration 202 to the measured data to thereby obtain noise filtered signals indicative of the at least part of the data communicated through said cable. The noise filtration 202 may include one or more of the following (not necessarily in this order):

202.*i*—Frequency Filtration:

As indicated above, generally, the cables conveying the data/power to the black-boxes may carry the data utilizing electromagnetic signals of one or more frequency ranges. The one or more frequencies of the measured electromagnetic signals include at least one predetermined data frequency range, which is indicative of frequencies by which the data is communicated through the respective cable to its respective black-box. Accordingly, in 202.*i* frequency filtration may be applied to the measured electromagnetic signals 201 to extract the predetermined data frequency range(s) from the measured electromagnetic signals, thereby obtaining the measured data indicative of the data signals communicated through the cable. The one or more frequencies of the measured electromagnetic signals may also include at least one predetermined power frequency range, which is indicative of frequencies by which the power is provided through the respective cable to the black-box. Accordingly, optionally in 202.*i*, frequency filtration may also be applied to the measured electromagnetic signals 201 to extract, from the measured electromagnetic signals, the parts of the predetermined power frequency range, and thereby obtain measured data indicative of the power supplied to the black-box. As indicated above, different types of black-boxes can generally receive data/power (via their corresponding cable(s)) at different frequency ranges. To this end, the method 200 can be implemented for passively collecting black-box data of different types of black-boxes receiving data/power at various frequencies.

Correlation Based Filtration 202.*ii*

As indicated above, in some implementations, the system 100 is implemented such that at least some cables are each furnished with several non-disruptive sniffers arranged along regions thereof. The parts of the measurements performed by such sniffers, due to signals through the cable, may be considered to be correlated between different sniffers, while the parts associated with noise may be generally considered to be non-correlated between differently located sniffers. Accordingly, correlation based filtration 202.*ii* may be applied to the measurements of several sniffers adjacent to different sections of the cable, in order to extract/emphasize the correlated part of the measurements of the sniffers and remove/diminish the non-correlated part. A simple such filtration may be implemented by mere summing of the measurements of the plurality of sniffers (possibly with introduction of proper time/delays (or phase delays if frequency based summation is applied) according to the location of the sniffers along the cable and the signal propagation speed through the cable. Such summation (which may generally also be considered as correlation based processing), increases the ratio of the correlated signal part to the non-correlated signal part within the sum, thus increasing the signal to noise in the summed signal. Alternatively, the correlated components (and possibly also the delays between different sections of the cables) may be computed utilizing autocorrelation/cross-correlation, or another technique, and the correlated part may be extracted.

Protocol Specific Filtrations—202.*iii* and/or 202.*iv*

Alternatively or additionally to the above described filtrations, a protocol specific filtration may be applied, based on the specific protocol by which the data signals are communicated through the cables. The protocol specific filtration may include: 202.*iii*—the above discussed modulation based filtering based on reference data indicative of the type of modulation used to encode data on the signals carried by the cable; and 202.*iv*—the above discussed packet based filtering based on reference data indicative of the packet format by which the encoded data is packed during said communication through the cable. Indeed these protocol specific filtrations are typically more suitable for extraction of data signals, which are typically communicated utilizing certain protocols, including certain modulations and/or certain packet formats. To this end, in some implementations, the above discussed modulation and packet-based filters, 202.iii and 202.iv may be applied only to those signal portions/frequency-ranges which are associated with data communication to the black-box.

Typically, as described above, the power supply is provided to the black-box(es) in a frequency range which is different from the predetermined data frequency range, and can be provided by the same cable which carries the data to the corresponding black box, or alternatively can be provided via another cable. Accordingly, the method 200 can further include separate measurement and filtration of data indicative of power supply provided to the black-box and processing the data indicative of power supply to determine a power state of the corresponding black-box. In particular, the one or more frequency ranges (of the measured electromagnetic signals) include at least one predetermined power supply frequency range indicative of frequencies by which power supply is provided to the black-box.

As a consequence of the above described noise filtration 202, noise filtered signals 203 are obtained indicative of the data and/or the power communicated through the cable.

The method 200 further includes processing of the noise filtered signals 203 to generate transmission signals including data indicative of said at least part of the black-box data. Optionally, the method 200 can also include transmitting said transmission signals to a remote receiver to facilitate real-time backup of the black-box data.

The invention claimed is:

1. A wireless flight recordation system for collecting black-box data of an aerial platform comprising one or more sensors, a black box for collecting black-box data comprising one or more flight recorders, and one or more black-box cables which provide data feed to the one or more flight recorders from the one or more sensors, the wireless flight recordation system comprising:
   one or more black-box data collectors comprising one or more black-box data sniffers configured to sense signals which are communicated through said one or more black-box cables, from outside said one or more black-box cables, thereby indirectly receiving said black-box data from the one or more sensors, without interfering with the cable or the signals communicated therethrough; and
   at least one data transmission interface connectable to the one or more black-box data collectors configured and operable for:
      establishing a wireless communication link with a wireless data communication network capable of providing data communication services to said aerial platform during flight, and
      transmitting said black-box data or at least a parts thereof, via said wireless data communication network to a remote receiver which is remote from the aerial platform.

2. The system of claim 1 wherein said black-box data includes at least one of cockpit voice recording (CVR) data and flight data recording (FDR) data;
   wherein said one or more black-box data suffers are configured and operable to at least one of the following:
   be connectable directly or indirectly to at least one or more flight sensors of the aerial platform for retrieving data therefrom and adapted to process said data to obtain at least a portion of said FDR data in real time; and
   be connectable directly or indirectly to one or more cockpit sensors of the aerial platform for retrieving data therefrom and are adapted to process said data to obtain at least a portion of said CVR data in real time.

3. The system of claim 2, wherein said data transmission interface is adapted to,
   receive black-box data obtained by the black-box data sniffers in real time, and
   pack and transmit said black-box data in real time to said remote receiver.

4. The system of claim 1, wherein said black-box data collectors comprise one or more signal duplicators adapted to interface with the one or more black-box cables and adapted for duplicating digital or analog signals of said data feed, to communicate a duplicate of signals to the respective flight recorder, and another duplicate of at least a part of said signals to the black-box data collector.

5. The system of claim 4, wherein each of said one or more black-box data sniffers is associated with a respective black-box cable of said one or more black-box cables.

6. The system of claim 5 wherein said black-box data sniffers comprise:
   at least one passive signal sniffer to be placed in proximity to a cable of said one or more black box cables and configured to measure electromagnetic signals of one or more frequency ranges in the vicinity of said cable to obtaining measured data indicative of at least part of the black box data communicated through said cable without disrupting data signals carried by said cable; and
   at least one noise filtration processor in communication with said passive signal sniffer for obtaining said measured data therefrom, configured and operable to apply noise filtering to said measured data to obtain noise filtered signals indicative of said at least part of the black-box data; and
   wherein said at least one transmission interface is connected to said one or more black-box data sniffers and to at least one transmitter, and is configured and operable for:
      processing the noise filtered signals obtained from the one or more black-box data sniffers to generate the transmission signals including data indicative of said at least part of the black-box data; and
      providing said transmission signals to the at least one transmitter.

7. The system of claim 6 wherein said passive sniffer is furnished at a circumference of a continuous section of said cable for sensing said electromagnetic signals, which are indicative of at least part of said data signals communicated through said continuous section of the cable, thereby not disrupting said data signals.

8. The system of claim 7 wherein said passive sniffer is configured and operable not to generate interfering signals disrupting said data signals in the cable.

9. The system of claim 7, wherein said passive sniffer comprises one or more of:
   an inductive sniffing module comprising one or more induction loops furnished to surround said circumference of the continuous section; and
   a capacitive sniffing module comprising one or more electrodes arranged near said continuous section.

10. The system of claim 6, wherein said at least one passive signal sniffer comprises a plurality of the passive signal sniffers in proximity to the cable;
   arranged along said cable at respectively different spatially spaced apart regions for measuring electromagnetic signals of one or more frequency ranges in the vicinity of said cable at said respectively different spatially spaced apart regions;

wherein the measured data obtained by each passive signal sniffer of said plurality of the passive signal sniffers, includes a signal of interest part, which is indicative of said at least part of the data communicated through said cable, as well as a noise/clutter part associated with sensed electromagnetic signals not originating from the data communicated through said cable; and wherein the noise filtration processor is in communication with said plurality of the passive signal sniffers for obtaining said measured data therefrom, and is configured and operable to:

apply the noise filtering by carrying out a correlation processing between the measured data obtained from the plurality of the passive signal sniffers to extract said noise filtered signals, or data indicative thereof, as being a highly correlated part of the measured data obtained from the said plurality of passive signal sniffers.

11. The system of claim 10, wherein said noise filtration processor comprises a correlation analyzer:

wherein the carrying out the correlation processing comprises determining a cross-correlation between the measured data obtained from different passive signal sniffers of said plurality of the passive signal sniffers to extract said noise filtered signals, or said data indicative thereof, as the part of said measured data for which the cross-correlation is above a certain predetermined cross-correlation threshold.

12. The system of claim 10, wherein said one or more frequency ranges comprise at least one predetermined data frequency range indicative of frequencies by which said data is communicated through said cable;

wherein said passive sniffer comprises a frequency filter adapted to extract said predetermined data frequency range from the electromagnetic signals being measured, to obtain the measured data indicative of the data signals.

13. The system of claim 6, wherein said at least one passive signal sniffer is configured and operable for measuring data indicative of power supply provided to the flight recorder;

wherein the passive signal sniffer further comprises a power state processor adapted to process the data indicative of power supply to determine a power state of a respective flight recorder;

wherein said at least one transmission interface is configured and operable for receiving and processing the power supply data to include data indicative thereof in said transmission signals.

14. The system of claim 13 wherein one or more of:

said power supply is provided to the flight recorder via said cable, and said one or more frequency ranges comprise at least one predetermined power supply frequency range indicative of frequencies by which power supply is provided via said cable to the respective flight recorder;

said power supply is provided to the respective flight recorder via an additional cable, and said black-box data sniffer further comprises a power supply sniffer to be placed in proximity to the additional cable for measuring electromagnetic signals at the predetermined power supply frequency range; and said frequency filter is further adapted to extract a portion of the electromagnetic signals being measured, which is associated with said predetermined power supply frequency range.

15. The system of claim 13, wherein said power state of the flight recorder is indicative of whether the flight recorder has malfunctioned.

16. The system of claim 6, wherein said noise filtration processor comprises a protocol analyzer connected to a memory storing protocol data indicative of a predetermined protocol by which the data feed is communicated to the respective flight recorder via said cable; and adapted for processing the measured data according to said predetermined protocol to identify portions of the measured data in compliance with said predetermined protocol, and filter out noise portions of the measured data not compliant with said predetermined protocol, to thereby obtain said noise filtered signals indicative of said at least part of the data feed.

17. The system of claim 16, wherein said predetermined protocol is indicative of at least one predetermined modulation/pattern by which the data is communicated to the flight recorder; and wherein said noise filtration processor is adapted to apply processing to the measured data to identify portions thereof which are compliant with/match said modulation/pattern and include data indicative of the identified portions being compliant/matched with said modulation/pattern, in said noise filtered signals.

18. The system of claim 1, further comprising an input port to be connected directly or indirectly to a GPS antenna of said aerial platform for receiving positioning signals indicative of global position of said aerial platform;

wherein said at least one transmission interface is configured and operable for obtaining and processing said positioning signals and to include data indicative thereof in said transmission signals.

19. The system of claim 1, comprising at least one black-box data sniffer of the plurality of black-box data sniffers which is configured to measure electromagnetic signals of one or more frequency ranges in the vicinity of a cable of the one or more black box cables and which comprises a noise filtration processors adapted to:

process at least a portion of a frequency range of a signal passing through said cable to identify data indicative portions thereof which are compliant with/match a specific protocol of data communicated therethrough; and apply processing to at least another portion of the frequency range to identify power consumption data, said power consumption data being indicative of proper operation or malfunction of the respective black-boxes.

20. The system of claim 6, wherein at least one of said transmission interface and said transmitter, are configured and operable to encrypt said transmission signals.

* * * * *